United States Patent
Ferjoux et al.

(10) Patent No.: US 11,602,903 B2
(45) Date of Patent: Mar. 14, 2023

(54) SYSTEM FOR JOINING ENDS OF RUBBER STRIPS TO SUPPLY AN EXTRUDER

(71) Applicant: COMPAGNIE GENERALE DES ETABLISSEMENTS MICHELIN, Clermont-Ferrand (FR)

(72) Inventors: Eddy Ferjoux, Clermont-Ferrand (FR); Nicolas Lechevalier, Clermont-Ferrand (FR); Gilles Mioche, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 0 days.

(21) Appl. No.: 17/413,210

(22) PCT Filed: Dec. 2, 2019

(86) PCT No.: PCT/FR2019/052883
§ 371 (c)(1),
(2) Date: Jun. 11, 2021

(87) PCT Pub. No.: WO2020/120873
PCT Pub. Date: Jun. 18, 2020

(65) Prior Publication Data
US 2022/0063208 A1    Mar. 3, 2022

(30) Foreign Application Priority Data

Dec. 14, 2018  (FR) ...................................... 1872928
Jan. 29, 2019  (FR) ...................................... 1900771

(51) Int. Cl.
*B29C 65/56*     (2006.01)
*B29D 30/06*    (2006.01)
(Continued)

(52) U.S. Cl.
CPC .............. *B29C 65/56* (2013.01); *B29D 30/06* (2013.01); *B32B 37/18* (2013.01); *B32B 38/06* (2013.01); *B29C 66/1122* (2013.01)

(58) Field of Classification Search
CPC ........ B32B 25/00; B32B 25/04; B32B 25/042; B32B 37/18; B32B 38/06; B29C 65/56;
(Continued)

(56) References Cited

U.S. PATENT DOCUMENTS 5,029,502 A * 7/1991 Irie .................... B29D 30/46
                                                         83/72
5,221,409 A    6/1993 Hart et al.
(Continued)

FOREIGN PATENT DOCUMENTS

DE    102018111735 A1 * 11/2019
JP     2004-142219 A     5/2004

OTHER PUBLICATIONS

Roisum, David R.. (1996). Mechanics of Rollers. Technical Association of the Pulp & Paper Industry (TAPPI). Retrieved from https://app.knovel.com/hotlink/toc/id:kpMR000027/mechanics-of-rollers/mechanics-of-rollers (Year: 1996).*

(Continued)

*Primary Examiner* — Carson Gross
(74) *Attorney, Agent, or Firm* — Venable LLP

(57) ABSTRACT

A system (10) for butt-joining two or more rubber strips (B1, B2) selected in accordance with a predetermined rubber mixture recipe in order to feed at least one extruder with a complex strip of rubber material ($B_{12}$) made from the butt joined rubber strips is disclosed. The system includes at least one conveyor that transports the rubber strips from an inlet (12) of the system to an outlet (14) of the butt-joining system; a frame (18) that operationally supports the conveyor to allow the continuous transport of the rubber strips and also to allow the simultaneous butt-joining of the rubber strips fed to the system; and a roller system (20) that butt-joins the rubber strips without penetration. The inven- (Continued)

tion also relates to a process for butt-joining rubber strips that is performed by the system.

10 Claims, 7 Drawing Sheets

(51) Int. Cl.
*B32B 37/18* (2006.01)
*B32B 38/06* (2006.01)
*B29C 65/00* (2006.01)

(58) Field of Classification Search
CPC .............. B29C 66/114; B29C 66/1142; B29C 48/2883; B29C 48/2888; B29C 66/853; B29C 66/1122; B65H 2301/4622; B65H 2301/46222; B65H 2301/463; B65H 2301/4632; B65H 21/00
See application file for complete search history.

(56) References Cited

U.S. PATENT DOCUMENTS

| | | | |
|---|---|---|---|
| 6,533,891 | B1 | 3/2003 | Kubinski |
| 9,919,468 | B1 | 3/2018 | Gatta et al. |
| 2008/0017297 | A1 | 1/2008 | Tanaka et al. |
| 2012/0035038 | A1* | 2/2012 | Lembach ............... B65H 21/00 |
| | | | 493/381 |
| 2017/0072652 | A1 | 3/2017 | Neubauer et al. |
| 2018/0044118 | A1* | 2/2018 | Preick ................... B29C 48/395 |
| 2018/0244433 | A1 | 8/2018 | Borchardt et al. |

OTHER PUBLICATIONS

International Search Report dated Mar. 12, 2020, in corresponding PCT/FR2019/052883 (5 pages).

* cited by examiner

[Fig. 1]
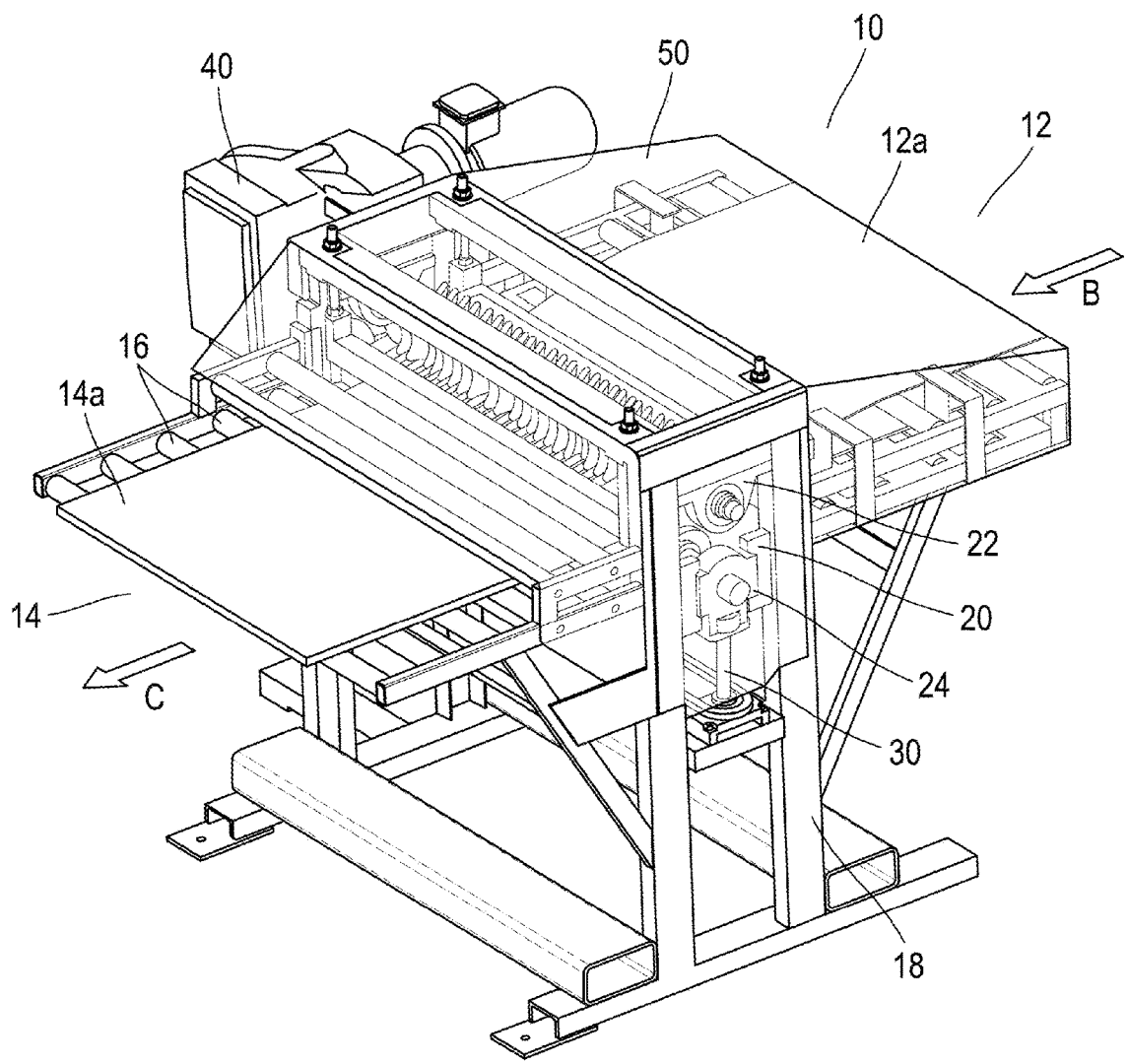

[Fig. 2]
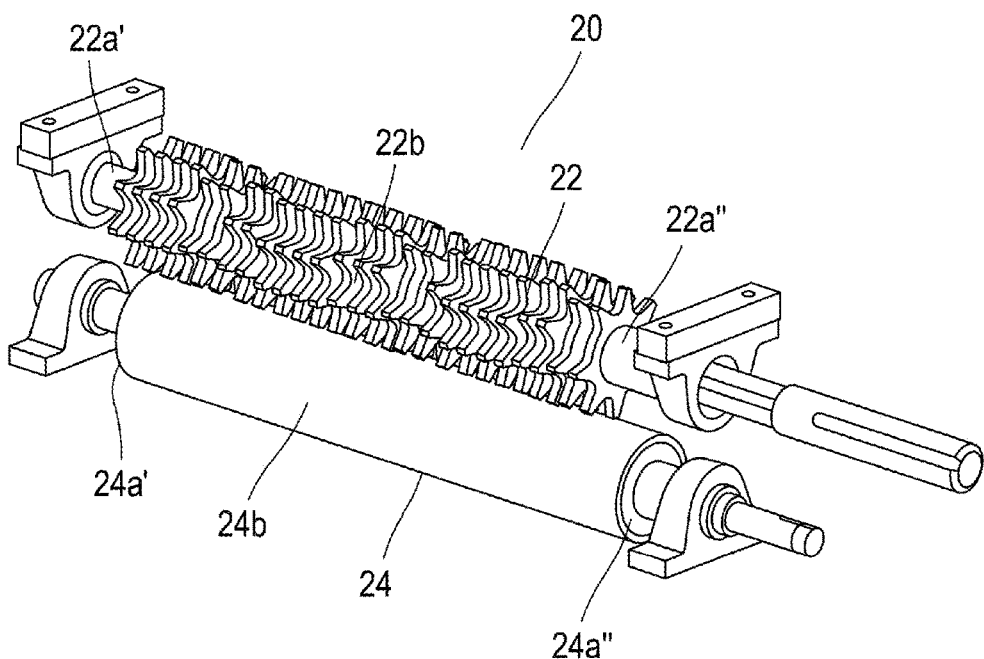
[Fig. 3]
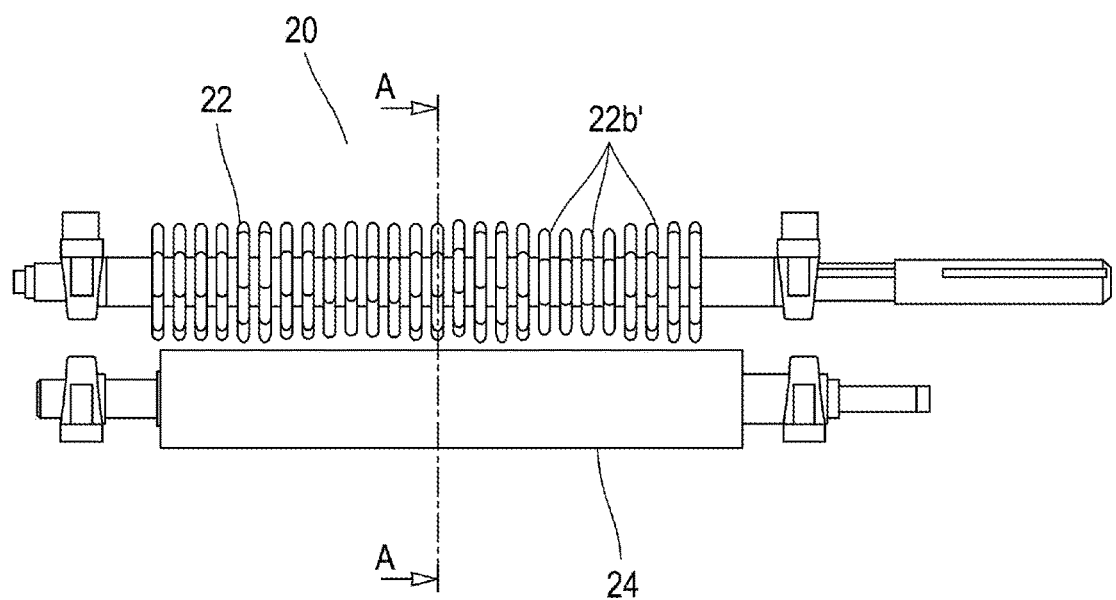

[Fig. 3A]
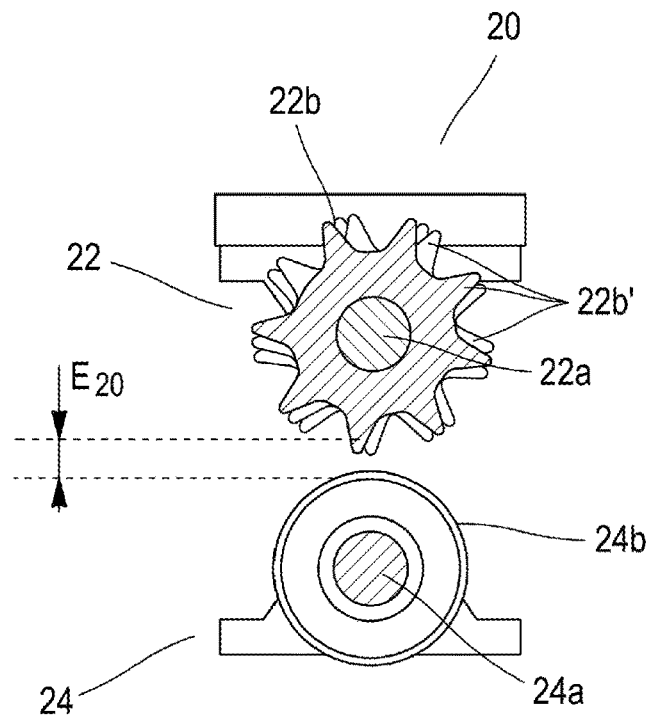
[Fig. 4]
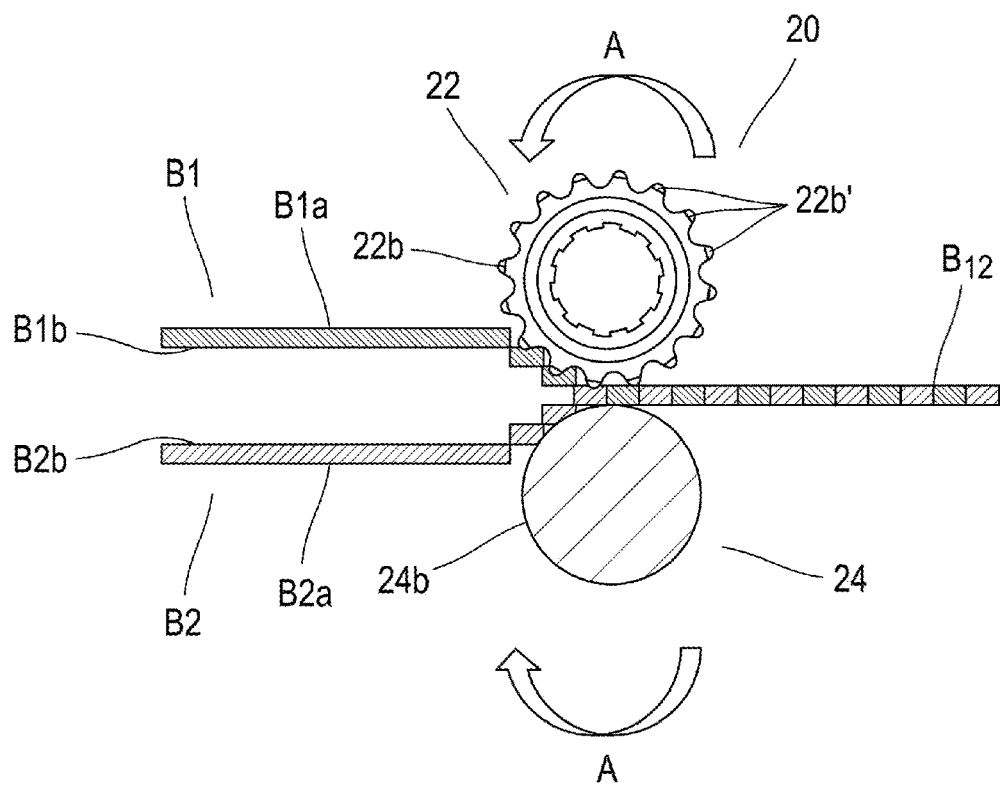

[Fig. 5]
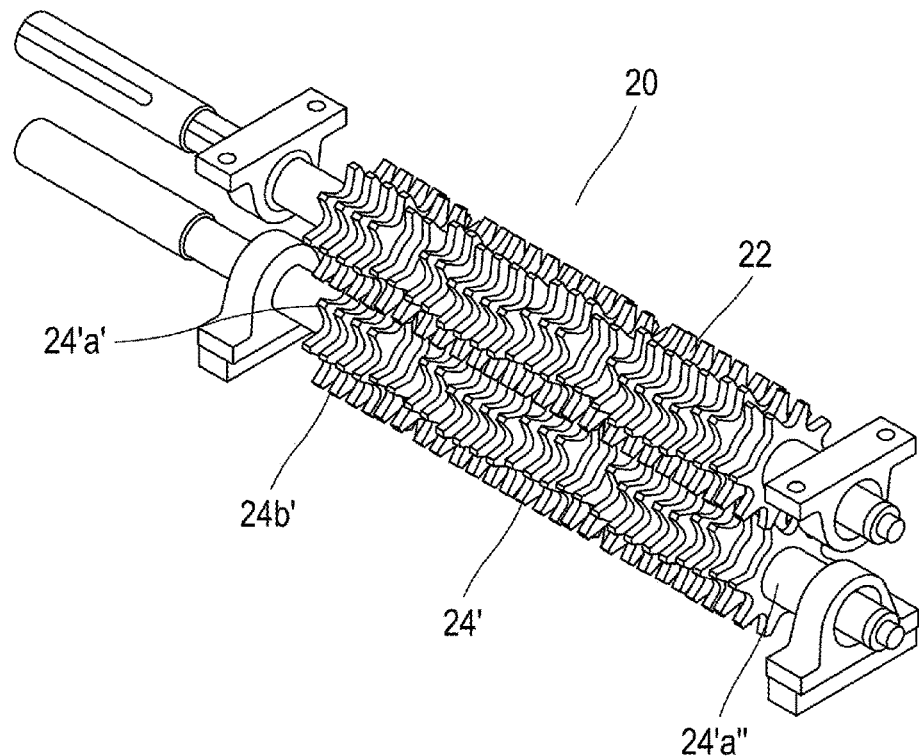
[Fig. 6]
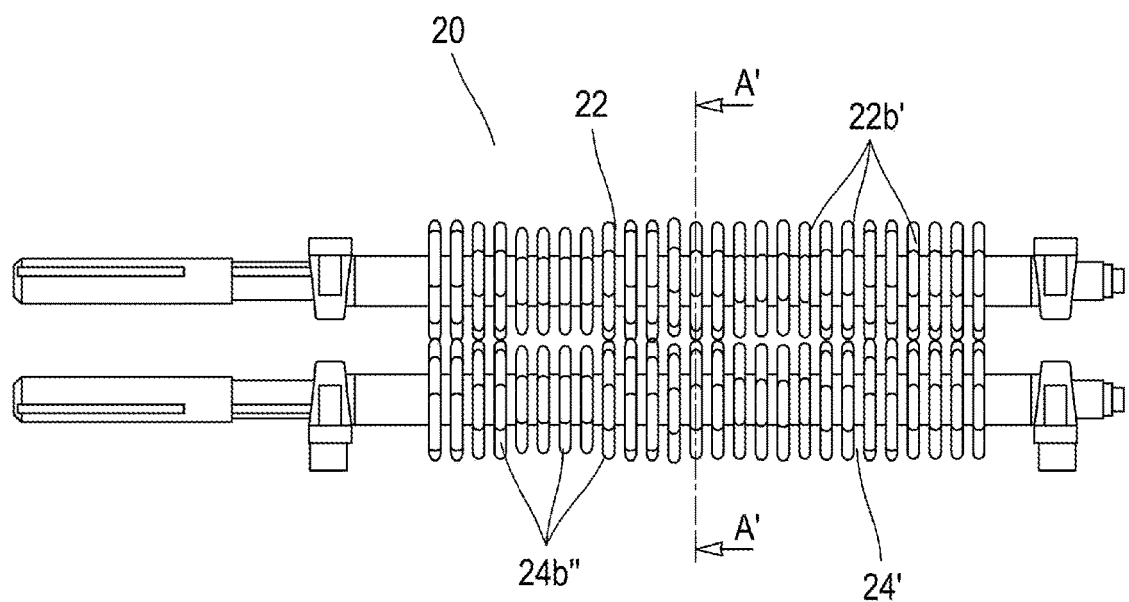

[Fig. 6A]
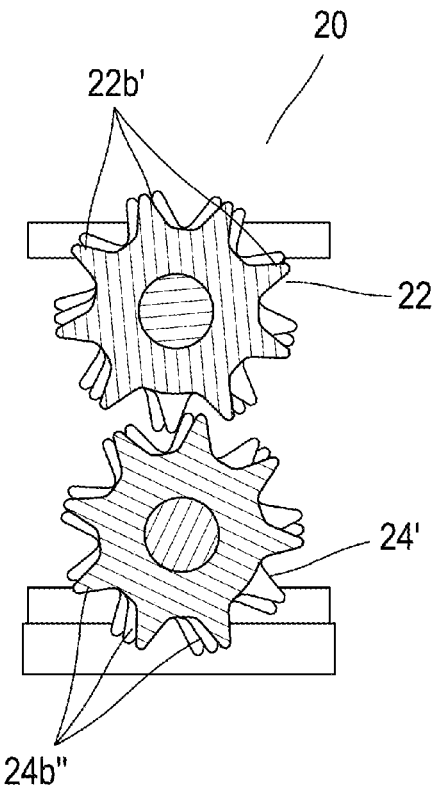
[Fig. 7]
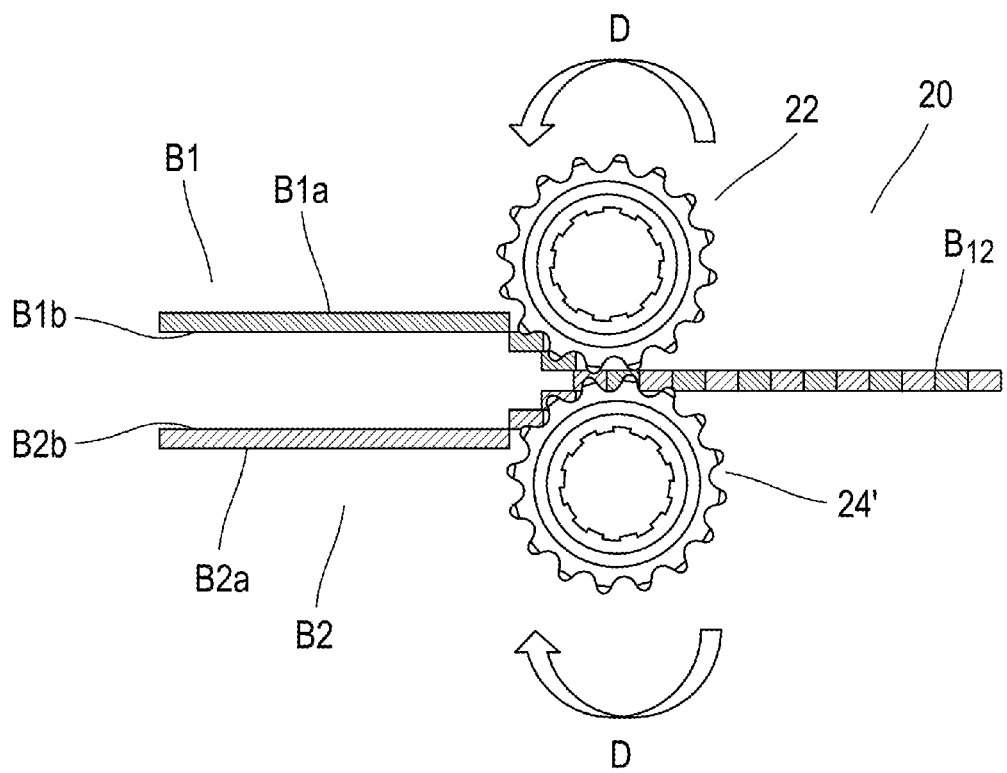

[Fig. 8]
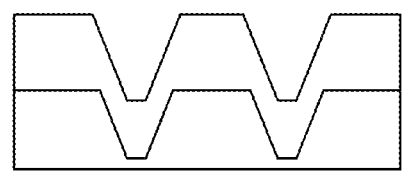
[Fig. 8A]
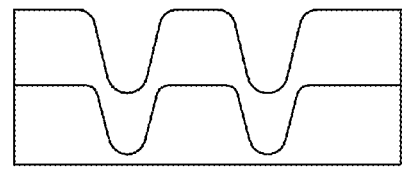
[Fig. 8B]

[Fig. 8C]
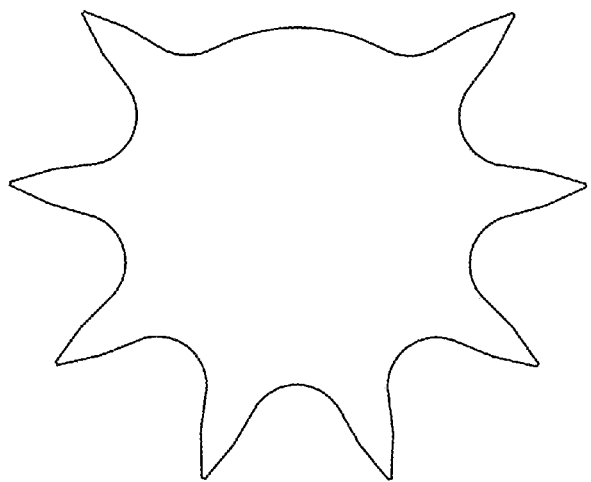

SYSTEM FOR JOINING ENDS OF RUBBER STRIPS TO SUPPLY AN EXTRUDER

TECHNICAL FIELD

The invention relates to a feed system for feeding an extruder with several rubber strips. More particularly, the invention relates to a system for feeding an extruder that butt-joins rubber continuously, avoiding feeding gaps.

BACKGROUND

In the manufacture of tires, it is necessary that the tire exhibit various performance aspects (for example, low rolling resistance, improved wear resistance, comparable grip under dry and wet conditions, an estimated mileage, etc.). Therefore, tires are made up of different types of rubber mixtures having properties essential to the functioning of the tire itself. In order to ensure that a commercial tire has the expected performance, a rubber mixture can be selected from a variety of rubber mixtures, each having different ingredients mixed in different quantities and derived from a variety of production sequences.

The rubber mixtures are often delivered to the extruders in the form of zig-zag or wig-wag strips. Two or more different rubber mixtures are often introduced manually into a feed portion of an extruder (as used herein, the term "extruder" refers to a variety of known extruders, including, but not limited to, screw extruders, extruders having torpedoes, and other equivalent extruders). The optimal operation of the extruders depends upon the consistency of the composition of the rubber material and the consistency of the feeding operation to which the composition is subjected. An example of an automated system for feeding extruders is disclosed by U.S. Pat. No. 9,919,468.

Although numerous types of rubber mixture are envisaged in the tire production processes, there is an optimal layout of the equipment for feeding the extruders in an automated manner. The need for uniform feeding must be respected by maintaining substantially automatic operation and without deterioration of the homogeneity of the resultant rubber strips. In addition, the possibility of creating loops of rubber (and therefore creating a buffer store) makes it possible to butt-join the products without prolonged shutdown of the conveyors. Thus, the disclosed invention proposes a system that effects the assembly, in a controlled and uniform manner, of two or more rubber strips without penetration of the latter.

SUMMARY OF THE INVENTION

The invention is directed to a system for butt-joining two or more rubber strips selected in accordance with a predetermined rubber mixture recipe in order to feed at least one extruder with a strip of complex rubber material made from the butt-joined rubber strips. The system includes at least one conveyor that transports the rubber strips from an inlet of the system to an outlet of the butt-joining system; and a frame that operationally supports the conveyor to allow the continuous transport of the rubber strips and also to allow the simultaneous butt-joining of the rubber strips fed to the system. The system also includes a roller system that butt-joins the rubber strips without penetration, the roller system having at least one upper roller and one lower roller, each roller having a center through which an axis of rotation of the roller extends and each roller having a cylindrical body of predetermined diameter that extends perpendicularly and rotates about its axis of rotation with respect to the frame that supports the roller system, the two rollers being disposed such that the two axes of rotation remain in the same plane with the axes parallel to one another, and the upper roller having a toothed surface along which a length of contact is established between a first fed rubber strip and the toothed surface while the first rubber strip passes through the roller system, the toothed surface having a plurality of teeth disposed consecutively along a common axis defined with respect to two opposite ends of the cylindrical body of the upper roller.

In certain embodiments of the system, the lower roller has a smooth surface along which a length of contact is established between a second fed rubber strip and the smooth surface while the second rubber strip passes through the roller system, the smooth surface having a circumferential surface that has a bearing surface between two opposite ends of the cylindrical body of the lower roller.

In certain embodiments of the system, the lower roller includes a complementary toothed surface along which a length of contact is established between the second fed rubber strip and the toothed surface of the lower roller while the second rubber strip passes through the roller system, the complementary toothed surface having a plurality of teeth disposed consecutively along a common axis defined with respect to the opposite ends of the cylindrical body of the lower roller in a complementary manner with respect to the teeth of the upper roller.

In certain embodiments of the system, the two rollers maintain an adjustable gap between the toothed surface of the upper roller and a surface of the lower roller.

In certain embodiments of the system, the conveyor includes an inlet belt that introduces the rubber strips at the inlet of the system and an outlet belt that transports the butt-joined rubber strips from the outlet of the system to one or more installations downstream of the system.

In certain embodiments of the system, the system also includes a feed inlet at which the rubber strips are supplied to the system with respect to the frame that supports the feed inlet.

The invention also relates to a process for butt-joining rubber strips that is carried out by the disclosed system. The process includes the following steps:

a step of supplying at least one first rubber strip and one second rubber strip, each rubber strip having the material properties chosen in accordance with a selected rubber mixture recipe;

a step of setting the upper and lower rollers in rotation in opposite directions;

a step of setting the conveyor into operation;

a step of feeding the two rubber strips on the conveyor to the inlet of the system;

a step of butt joining the two rubber strips to form the complex strip, this step including a step of simultaneously passing the two rubber strips between the upper roller and the lower roller so as to maintain uniform contact between an opposite surface of the first rubber strip and an opposite surface of the second rubber strip without one penetrating the other; and a step of the complex strip exiting the roller system.

In certain embodiments of the process, the butt-joining step includes the butt-joining of the end of the first rubber strip to the start of the second rubber strip without the conveyor being interrupted and such that a joint made between the end of the first rubber strip and the start of the second rubber strip does not penetrate the first rubber strip or the second rubber strip.

In certain embodiments of the process, the process also includes a step of adjusting a gap between the upper roller and the lower roller.

In certain embodiments of the process, the process also includes a step of detecting a thickness of the complex strip exiting the roller system.

Further aspects of the invention will become obvious from the following detailed description.

BRIEF DESCRIPTION OF THE DRAWINGS

The nature and various advantages of the invention will become more obvious from reading the following detailed description, in conjunction with the attached drawings, throughout which the same reference numerals denote parts that are identical, and in which:

FIG. 1 shows a perspective view of a system for butt-joining rubber strips according to the invention.

FIG. 2 shows a perspective view of one embodiment of a roller system of the butt-joining system of FIG. 1.

FIG. 3 shows a side view of the roller system of FIG. 2.

FIG. 3A shows a cross-sectional view of the roller system of FIG. 3 along the line A-A.

FIG. 4 shows a schematic view of the roller system of FIGS. 2 to 3A during a cycle of a process for butt-joining rubber strips.

FIG. 5 shows a perspective view of another embodiment of the roller system of the butt-joining system of FIG. 1.

FIG. 6 shows a top view of the roller system of FIG. 5.

FIG. 6A shows a cross-sectional view of the roller system of FIG. 3 along the line A'-A'.

FIG. 7 shows a schematic view of the roller system of FIGS. 5 to 6A during a cycle of a process for butt-joining rubber strips.

FIGS. 8, 8A and 8B show cross-sectional views of the butt-joined rubber strips.

FIG. 8C shows a cross-sectional view of a representative tooth of a roller of the roller system.

DETAILED DESCRIPTION

Referring now to the figures, in which the same numerals identify identical elements, FIG. 1 shows an embodiment of a butt-joining system (or "system") 10 that feeds at least one extruder (not shown) with two or more strips of rubber material. The extruder can be chosen from known screw extruders that are commercially available. The system 10 may include an installation of a system for producing tires.

The strips are manufactured from different rubber materials in accordance with a predetermined rubber mixture recipe. Each rubber strip can be manufactured from a known rubber composition, including a diene rubber, that is to say from any elastomer derived at least in part from a diene monomer. This diene elastomer may be selected from polybutadienes (BRs), natural rubber (NR), synthetic polyisoprenes (IRs), butadiene copolymers, isoprene copolymers and blends of these elastomers, such copolymers being chosen from butadiene-styrene copolymers (SBRs), isoprene-butadiene copolymers (BIRs), isoprene-styrene copolymers (SIRs) and isoprene-butadiene-styrene copolymers (SBIRs).

A rubber composition selected for a rubber strip may contain one or more diene elastomers and one or more additives commonly used in the rubber matrices intended for tire manufacture. Such fillers include, in a non-limiting manner, carbon black, silica, coupling agents, anti-ageing agents, antioxidants, plasticizers, extension oils, plasticizing resins with a high glass transition temperature (higher than 30° C.), agents that facilitate the processability of the compositions in the raw state, tackifying resins, antireversion agents, methylene acceptors and donors, reinforcing resins, known adhesion-promoting systems of the metal salt type, and a crosslinking or vulcanization system. When preparing a blend of two or more rubber strips, a person skilled in the art will know how to adjust the formulation of the rubber composition in order to derive properties desired for a specific tire.

Each rubber strip is created in the form of a continuous element of profiled product (meaning a generally elongate rubber element of predetermined width and thickness, that is intended to be used in tires and tire products such as inner liners, lateral walls, carcasses, treads, etc.). The rubber strips are supplied on one or more known pallets (not shown) and/or fed to the system 10 by one or more manual or automated means (for example one or more robot effectors) (not shown).

The system 10 includes at least one conveyor that transports the rubber strips from an inlet 12 of the system to an outlet 14 of the system. By way of example, a representative conveyor is provided that includes an inlet belt 12a that inputs the rubber strips into the system 10 and an outlet belt 14a that transports the butt-joined rubber strips from the system to one or more downstream installations (for example, one or more extruders and/or other mixers). The inlet belt 12a and the outlet belt 14a may include one belt or a plurality of belts in continuous movement by virtue of known rollers 16. It will be understood that other equivalent conveyors can be used (for example, one or more belt or roller conveyors or known equivalents thereof).

Referring again to FIG. 1, a frame 18 operationally supports the belts 12a, 14a to allow the continuous transport of the rubber strips and also to allow the simultaneous butt-joining of the rubber strips fed to the system 10. Together with the belts 12a, 14a, the frame 18 supports a roller system 20 that butt-joins the selected rubber strips. The frame 18 can also support an optional feed inlet 50 at which the rubber strips are supplied to the system 10. In the embodiments of the system having the feed inlet 50, the rubber strips are guided to the roller system 20 by the inlet belt 12a.

Referring again to FIG. 1 and also to FIGS. 2 to 4, in one embodiment of the invention, the roller system 20 includes an upper roller 22 and a lower roller 24. It will be understood that a roller system with rollers 22, 24 is given by way of example and that the roller system 20 is adaptable for use in existing butt-joining systems.

The upper roller 22 includes a cylindrical body 22a of predetermined diameter that is chosen depending on the properties of the rubber strips (including, in a non-limiting manner, the thicknesses and material properties thereof). The upper roller 22 has a toothed surface 22b along which a length of contact is established between a fed rubber strip and the toothed surface while the rubber strip passes through the roller system 20. The toothed surface 22b has a plurality of teeth 22b' fixed between two opposite ends 22a' and 22a" of the cylindrical body 22a. The teeth 22b' are disposed consecutively along a common axis defined with respect to the opposite ends 22a', 22a". The length of contact of the toothed surface 22b can be adapted depending on a width of the rubber strip. This configuration may take the form of a pinion, which has an advantage of making indentations in a surface of a rubber strip without tearing the rubber strip.

The lower roller 24 has a cylindrical body 24b of predetermined diameter that is chosen depending on the properties of the rubber strips (including, in a non-limiting manner, the thicknesses and material properties thereof). The lower roller 24 has a smooth surface 24*b* along which a length of contact is established between a fed rubber strip and the smooth surface while the rubber strip passes through the roller system 20. The smooth surface 24*b* has a circumferential surface that has a bearing surface between two opposite ends 24*a'* and 24*a"* of the cylindrical body 24*a*. The length of contact of the smooth surface 24*b* can be adapted depending on a width of the rubber strip. The length of contact of the smooth surface 24*b* can also be adapted depending on the length of contact of the toothed surface 22*b* of the upper roller 22.

Each roller 22, 24 has a center through which an axis of rotation of the roller extends. Each roller 22, 24 extends perpendicularly and rotates about its axis of rotation with respect to the frame 18 that supports the roller system 20. The rollers 22, 24 are disposed such that the two axes of rotation remain in the same plane with the axes parallel to one another. The position of the rollers 22, 24 with respect to the frame 18 is adjustable depending on the properties of the rubber strips to be butt-joined.

The upper roller 22 and the lower roller 24 maintain a predetermined gap $E_{20}$ between the toothed surface 22*b* of the upper roller 22 and the smooth surface 24*b* of the lower roller 24. This gap can be adjusted depending on the material properties and thicknesses of the rubber strips to be butt-joined during a cycle of a butt-joining process of the system 10. An adjustment device 30 is shown in FIG. 1 that includes a known means for making this gap adjustment (for example, by means of linear actuation, which can be effected by a cylinder-piston unit or by some other known actuator).

During a process for butt-joining rubber strips that is carried out by the system 10, one or more drive motors (depicted in FIG. 1 by the motor 40) set the two rollers 22, 24 in rotation in opposite directions (the direction of rotation of each roller being indicated by the arrows A in FIG. 4). Each roller 22, 24 can be driven by a corresponding programmable drive motor that controls a speed of rotation for each roller (which may, for example, be a speed of a moving rubber strip). In a variant, a common drive system (for example, gearing or a belt or an equivalent system) can control the rotation of the two rollers. During a cycle of butt-joining rubber strips, the respective speed of each roller ensures the generally constant thickness of a butt-joined rubber strip exiting the roller system 20, while facilitating the alignment and adhesion of the rubber strips fed to the system 10.

Referring again to FIGS. 1 to 4, and particularly to FIG. 4, an example of a cycle of a butt-joining process according to the invention is described, using the system 10 with the rollers 22, 24. Upon starting a cycle of the process for butt-joining the rubber strips, the butt-joining process includes a step of supplying at least one first rubber strip B1 and one second rubber strip B2. It will be understood that the two strips B1, B2 are used by way of example and that two or more rubber strips can be introduced into the system 10 during this step. The properties of the two rubber strips B1, B2 are different and they are chosen in accordance with a selected rubber mixture recipe. It will be understood that the rubber strips can be supplied on corresponding pallets (or by other equivalent means) that identify the material properties of each rubber strip (for example, by way of an RFID code, by way of a barcode, by way of self-learning means and/or by way of other known equivalent means).

The butt-joining process also includes a step of setting the rollers 22, 24 in rotation (see the arrows in FIG. 4). This step may include a step of setting the inlet belt 12*a* and/or the outlet belt 14*a* into conveying operation. In all embodiments of the system 10, the speed of rotation of each roller may be variable during the cycle.

The butt-joining process also includes a step of feeding the two rubber strips B1, B2 on the inlet belt 12*a* already in conveying operation (see the arrow B in FIG. 1). In the embodiments of the system 10 including a feed inlet 50, the feed inlet allows the introduction of the rubber strips on the inlet belt 12*a* into the roller system 20. The first rubber strip B1 includes a bearing surface B1*a* that will be introduced into the roller system 20 such that the toothed surface 22*b* of the upper roller 22 engages with the bearing surface B1*a* during the process for butt-joining the two rubber strips. The second rubber strip B2 includes a bearing surface B2*a* that will be introduced into the roller system 20 such that the smooth surface 24*b* of the lower roller 24 engages with the bearing surface B2*a* during the process for butt-joining the two rubber strips. Each rubber strip B1, B2 includes a corresponding opposite surface B1*b*, B2*b* that will be introduced into the roller system such that the two opposite surfaces face one another during this feeding step. Each rubber strip B1, B2 has a respective predetermined thickness defined between a bearing surface B1*a*, B2*a* and a corresponding opposite surface B1*b*, B2*b*.

The butt-joining process also includes a step of butt-joining the two rubber strips B1, B2. This step includes a step of simultaneously passing the two rubber strips B1, B2 towards the gap $E_{20}$ between the toothed surface 22*b* of the upper roller 22 and the smooth surface 24*b* of the lower roller 24. During the step of butt-joining the rubber strips B1, B2, the upper roller 22 keeps the first rubber strip B1 along a tangential contact line, with the bearing surface B1*a* of the first rubber strip being engaged by the teeth 22*b'* without the first rubber strip being penetrated. During the step of butt-joining the rubber strips B1, B2, the lower roller 24 keeps the second rubber strip B2 along a tangential contact line, with the bearing surface B2*a* of the second rubber strip being engaged by the smooth surface 24*b*. During the step of butt joining the rubber strips B1, B2, the opposite surfaces B1*b*, B2*b* of the two respective rubber strips are kept along a contact line in order that the two rubber strips can engage along opposite surfaces without penetrating one another.

During the butt-joining step, the system 10, without the conveyor being interrupted, butt-joins the end of the first rubber strip B1 to the start of the second rubber strip B2. It will be understood that the butt-joining can be carried out for the rubber strips of a common pallet and/or for the rubber strips of successive pallets. A joint made between the end of a first rubber strip and a start of a second rubber strip does not penetrate the first strip or the second strip. Thus, the butt joint obtained makes it possible to use a long length of rubber strip (for example, two or more pallets) in a downstream process without operator intervention.

The rubber strips now butt-joined form a complex strip B12 that includes all of the material properties of the two rubber strips. During the butt-joining step, the rotation of each roller 22, 24 is performed so as to maintain uniform contact between the opposite surface B1*b* of the first rubber strip B1 and the opposite surface B2*b* of the second rubber strip B2. Thus, the pressure is applied uniformly in a controllable manner so as to eliminate undesirable penetrations in the complex strip B12.

The butt-joining process also includes a step of the complex strip exiting the roller system 20. Once the rubber strips B1, B2 have been assembled and butt-joined as a complex product, the roller system 20 directs the complex strip B12 towards the outlet belt 14a (already in conveying operation) for processing at a downstream installation that performs a mixing step (for example, a mixing installation having at least one extruder) (see the arrow C in FIG. 1).

Referring to FIGS. 5 to 7, in which the same numerals identify the same elements, another embodiment of the roller system 20 is shown that is usable in the system 10 in FIG. 1. In this embodiment, the roller system 20 includes an upper roller 22 as described above. The roller system 20 also includes a lower roller 24' that has a complementary toothed surface 24b' along which a length of contact is established between a fed rubber strip and the toothed surface of the lower roller while the rubber strip passes through the roller system 20. The complementary toothed surface 24b' of the lower roller 24b' has a plurality of teeth 24b'' fixed between two opposite ends 24'a', 24'a'' of a cylindrical body. The teeth 24b'' are disposed consecutively along a common axis defined with respect to the opposite ends 24'a', 24'a'' in a complementary manner to the teeth 22b' of the upper roller 22. This configuration of the lower roller may take the form of a pinion as described above with respect to the upper roller 22.

Referring to FIG. 7, a cycle of a butt-joining process using this embodiment of the invention is performed in the same way as described above with respect to the embodiment of FIGS. 2 to 4 (the directions of rotation of the two rollers 22, 24' are indicated by the arrows D in FIG. 7). Each bearing surface B1a, B2a of a respective rubber strip B1, B2 is engaged by a respective toothed surface 22b, 24b' in order to form the complex strip B12. The pressure is again applied uniformly in a controllable manner so as to eliminate undesirable penetrations in the complex strip B12.

In all embodiments of the butt-joining process according to the invention, the butt-joining process may also include a step of adjusting the gap $E_{20}$ (either between the toothed surface 22b of the upper roller 22 and the smooth surface 24b of the lower roller 24, or between the toothed surface 22b of the upper roller 22 and the complementary toothed surface 24b' of the lower roller 24'). During this step, the gap between the rollers may be variable during the cycle of a butt-joining process.

Referring to FIGS. 8, 8A and 8B, each set of teeth 22b', 24b'' may have a predetermined cross-sectional geometry. In the illustrative embodiments depicted, complex strips of various geometries are produced from rubber strips butt-joined by the system 10. Such selected geometries include a V-shaped configuration (see FIG. 8), a U-shaped configuration (see FIG. 8A) and a bent configuration (see FIG. 8B). It will be understood, of course, that other geometries could be substituted therefor. In one embodiment of the invention, one tooth is locally eliminated regardless of the selected geometry (see FIG. 8C by way of example). The elimination of one tooth allows a rubber strip to pass without being butt-joined and without stopping the ongoing process.

The system 10 may also have at least one sensor (not shown) that performs a step of detecting a thickness of the complex strip B12 exiting the roller system and of determining a detected value of the thickness compared with a reference thickness (for example, by determining the compliance with one or more specifications for the complex strip B12). The sensor can be disposed just upstream of the rollers of the roller system 20 so as to detect the thickness of each rubber strip entering the roller system. The sensor can therefore indicate whether an adjustment of the gap $E_{20}$ is necessary in order to ensure a generally constant thickness of the complex strip before the complex strip is fed to an extruder (or to some other installation) downstream.

The system 10 may be a system among a plurality of systems that together form at least one part of a tire production system, one or more of which can be controlled by one or more programmable control units. One cycle of a butt-joining process according to the invention can be carried out under the control of the PLC and may include pre-programming of management information. For example, a profile can be associated with the complex strip that is supplied by the system 10, including the material properties of the complex strip exiting the system.

For all embodiments, a monitoring system could be installed. At least one part of the monitoring system may be supplied in a portable device such as a mobile network device (for example, a mobile telephone, a laptop computer, one or more portable devices connected to the network (including "augmented reality" and/or "virtual reality" devices, portable clothing connected to the network and/or any combinations and/or any equivalents)).

In embodiments of the invention, the system 10 may receive voice commands or other audio data representing, for example, starting or stopping of rotation of the rollers of the roller system 20. The request may include a request for the current state of a cycle of the butt-joining process. A response generated can be represented audibly, visually, in a tactile manner (for example by way of a haptic interface) and/or in a virtual or augmented manner.

In one embodiment, the process may include a step of training the system 10 (or training a system that incorporates the system 10) to recognize representative values of a complex strip exiting the system 10 (for example, a thickness value) and to perform a comparison with target values. This step may include the step of training the system to recognize a lack of equivalence between the compared values. This training step includes a classification generated by self-learning means. This classification may include, in a non-limiting manner, parameters of the materials of the rubber strips that are selected in accordance with the chosen mixture recipe.

The invention maintains optimal productivity while preserving the various properties of the rubber. At the same time, the invention avoids the penetrations associated with the existing solutions. Thus, a single system is provided that is adaptable for processing a variety of mixtures without changing equipment in a tire production system.

The terms "at least one" and "one or more" are used interchangeably. The ranges given as lying "between a and b" encompass the values "a" and "b".

Although particular embodiments of the disclosed apparatus have been illustrated and described, it will be understood that various changes, additions and modifications can be made without departing from the spirit or the scope of the present description. Therefore, no limitation should be imposed on the scope of the invention described, apart from those set out in the appended claims.

The invention claimed is:

1. A system for joining ends of two or more rubber strips selected in accordance with a predetermined rubber mixture recipe in order to feed at least one extruder with a complex strip of rubber material made from the joined rubber strips, the system comprising:
  at least one conveyor that transports the rubber strips from an inlet of the system to an outlet of the system;
  a frame that operationally supports the conveyor to allow the continuous transport of the rubber strips and to allow the simultaneous joining of the ends of the rubber strips fed to the system; and a roller system that joins the ends of the rubber strips, the roller system comprising at least one upper roller and one lower roller, each roller having a center through which an axis of rotation of the roller extends and each roller having a cylindrical body of predetermined diameter that extends perpendicularly and rotates about its axis of rotation with respect to the frame that supports the roller system, the two rollers being disposed such that the two axes of rotation remain in the same plane with the axes of rotation parallel to one another, and the upper roller having a toothed surface along which a length of contact is established between a first fed rubber strip and the toothed surface while the first fed rubber strip passes through the roller system, the toothed surface comprising a plurality of teeth disposed consecutively along a common axis defined with respect to two opposite ends of the cylindrical body of the upper roller.

2. The system according to claim 1, wherein the lower roller comprises a smooth surface along which a length of contact is established between a second fed rubber strip and the smooth surface while the second fed rubber strip passes through the roller system, the smooth surface comprising a circumferential surface that has a bearing surface between the opposite ends of the cylindrical body of the lower roller.

3. The system according to claim 1, wherein the lower roller comprises a complementary toothed surface along which a length of contact is established between a second fed rubber strip and the toothed surface of the lower roller while the second fed rubber strip passes through the roller system, the complementary toothed surface comprising a plurality of teeth disposed consecutively along a common axis defined with respect to the opposite ends of the cylindrical body of the lower roller in a complementary manner with respect to the teeth of the upper roller.

4. The system according to claim 1, wherein the two rollers maintain an adjustable gap between the toothed surface of the upper roller and a surface of the lower roller.

5. The system according to claim 1, wherein the conveyor comprises an inlet belt that introduces the rubber strips at the inlet of the system and an outlet belt that transports the joined rubber strips from the outlet of the system to one or more installations downstream of the system.

6. The system according to claim 1, further comprising a feed inlet at which the rubber strips are supplied to the system with respect to the frame that supports feed inlet.

7. A process for joining ends of rubber strips that is carried out by the system according to claim 1, the process comprising the following steps:

supplying at least one first fed rubber strip and one second fed rubber strip, each rubber strip selected in accordance with the predetermined rubber mixture recipe;

setting the upper and lower rollers in rotation in opposite directions;

setting the conveyor into conveying operation;

feeding the two rubber strips on the conveyor to the inlet of the system;

joining ends of the two rubber strips to form the complex strip by simultaneously passing the two rubber strips between the upper roller and the lower roller so as to maintain uniform contact between an opposite surface of the first fed rubber strip and an opposite surface of the second fed rubber strip; and exiting the complex strip from the roller system.

8. The process according to claim 7, wherein the joining step comprises joining an end of the first fed rubber strip to a start of the second fed rubber strip without the conveyor being interrupted.

9. The process according to claim 7, further comprising adjusting a gap between the upper roller and the lower roller.

10. The process according to claim 7, further comprising recognizing representative values of a complex strip exiting the system based on at least one thickness value detected by a sensor.

* * * * *